July 16, 1957 D. B. SMITH ET AL 2,799,558
PROCESS OF CALCINING ALUMINA TRIHYDRATE IN FLUIDIZED BED
Filed Feb. 17, 1954
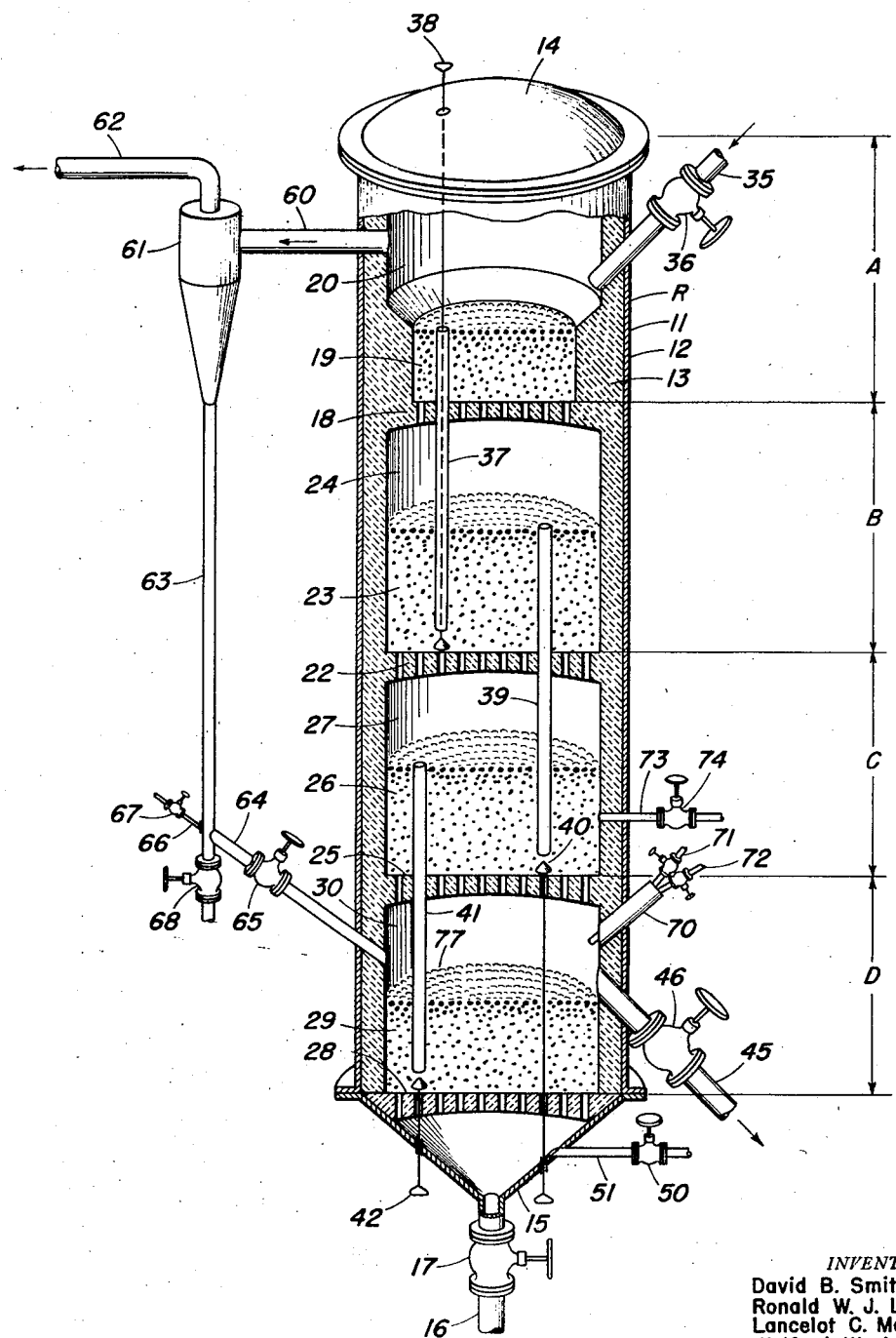
INVENTORS
David B. Smith
Ronald W. J. Lewis
Lancelot C. Malabre
Walfred W. Jukkola
Thomas D. Heath
BY William J. Fox
ATTORNEY

United States Patent Office 2,799,558
Patented July 16, 1957

2,799,558

PROCESS OF CALCINING ALUMINA TRIHYDRATE IN FLUIDIZED BED

David B. Smith, Toronto, Ontario, Ronald W. J. Lewis, Dorval, Quebec, Canada, and Lancelot C. Malabre, Mandeville, Jamaica, British West Indies, and Walfred W. Jukkola and Thomas D. Heath, Westport, Conn.; said Smith, said Jukkola, and said Heath assignors to Dorr-Oliver Incorporated, a corporation of Delaware Application February 17, 1954, Serial No. 410,847

2 Claims. (Cl. 23—142)

This invention relates generally to the calcination of aluminum hydrate and more particularly to improved ways and means for the calcination of finely-divided aluminum hydrates in accordance with the fluidized solids technique.

In general, in the fluidized technique for treatment solids, a bed of subdivided solid particles is maintained as a dense non-stratifying homogeneous suspension behaving like a turbulent liquid and exhibiting a fluid level. This is accomplished by passing through the bed an uprising stream of gas at a velocity sufficient to considerably expand the depth of the bed as well as to maintain its particles in turbulent suspension in the uprising gas stream. Under such conditions, the bed is called a fluidized bed. The fluid level of this fluidized bed is maintained by the use of a spill-pipe or overflow arrangement so that as more solid particles are introduced into the bed the resulting increased depth causes the particles to overflow down through the spill-pipe just as a fluid does.

Fluid operation results in excellent diffusion of heat through the fluidized bed and is, therefore, particularly well adapted for treating solids at elevated temperatures. Typical processes are exothermic reactions, i. e. sulfide roasting, where the heat is supplied by the reaction itself; and the endothermic calcination of limestone wherein heat is supplied by burning fuel directly in the fluidized bed or by supplying hot gases and/or entrained solids to the bed. In all cases the limitation must be observed that the bed temperature does not exceed the fusion point of the bed solids.

Proper fluidization depends upon a maintained gas velocity through the bed sufficient to turbulently mobilize the bed solids to render them as a dense homogeneous suspension of solids. This gas velocity must also be kept below a certain maximum in order to prevent too many bed solids from being entrained and carried away in the exiting gas stream. In other words, the fluidizing gas velocities are sufficient to fluidize the bed solids as a dense turbulent suspension and to carry a portion of the solids from the bed by gas entrainment. Fluidizing gas velocity is measured as that linear velocity which the quantity of gas passing through the bed would exhibit in passing through the reactor when the reactor is devoid of solids, this linear velocity is called "space rate."

In a reactor having a plurality of zones, several beds of solids are simultaneously maintained in such a fluidized state. Each fluidized bed is usually a separate distinct treatment stage. The treated solid particles from the first bed are discharged or allowed to overflow to a second bed for further treatment then discharge to the next bed for even further treatment, etc. This process continues until the particles have passed through all of the fluidized beds after which they are discharged from the reactor. This type of operation is usually referred to as multi-stage.

It has been proposed to calcine aluminum hydrate in accordance with the multi-stage fluidized technique in which use is made of a plurality of superposed beds of fluidized solids within a single enclosed vessel. Incoming feed is preheated in one or more superjacent fluidized beds then calcined in a separate subjacent bed where fuel is combusted to supply heat to the bed, finally the calcined solids are discharged to a further subjacent fluidized bed where they are cooled by an uprising gas stream prior to discharge from the reactor.

The aim of such processes is to yield a calcine amenable to further treatment in the production of metallic aluminum. This means that the calcine must be both anhydrous and non-hygroscopic.

During calcination of aluminum hydrate for this purpose, two distinct changes occur in the material being treated. The first is a simple dehydration step where water is given up, as shown by the equation:

$$Al_2O_3 \cdot XH_2 + heat \rightarrow Al_2O_3 + XH_2O \; (g)$$

This reaction proceeds readily at temperatures lower than 1000° F., but the resulting $Al_2O_3$ is not an acceptable product because it is hygroscopic and readily absorbs moisture. To produce an acceptable product, it is necessary to cause the second distinct change of property, i. e. heat stabilization, to produce the required non-hygroscopic form. To induce this change, it is necessary to carry out calcination at temperatures in the region of 1650° F.–1800° F., where some crystal transformation apparently occurs, and the material is rendered non-hygroscopic.

It was originally believed that all of the alumina must be subjected to this high temperature calcination in order to yield an acceptable non-hygroscopic product, however, we have discovered that this is not true and this discovery constitutes the basis for this invention as will be hereinafter pointed out.

Such multi-stage processes have in test work proven capable of yielding a commercially acceptable non-hygroscopic product, however, because of high dust losses due to entrainment in the reactor exit gases, are not commercially attractive.

The dust which is carried out of the reactor with the exit gases is not an acceptable commercial product because it contains a high percentage of uncalcined or partially calcined solids stripped from the fluidized beds of the reactor. As a result of this, it is usual in a process such as the one described, to lose as much as 20 to 25% of the total product by entrainment in the reactor exit gases.

It has been proposed to overcome this dust loss by separating the dust from the exit gases and returning it to the reactor either as new feed or mixed with the regular feed supply. Such a practice will serve the purpose of forcing the material to eventually pass through the reactor to final discharge as fully calcined product. However, this practice also results in building up a high circulating dust load between the calcining bed and the upper preheating bed which in turn causes the temperature of the upper bed to increase with the result that the temperature of the exit gases increases and heat is lost from the system in the form of excessively heated exit gases. Since these hotter gases extract an increased quantity of heat from the reactor, the inevitable result is the necessity for supplying additional fuel to the reactor in order to maintain proper calcining temperatures, thus increasing operating costs.

It is therefore a principal object of this invention to overcome the above objects and to provide improved ways and means for calcining aluminum hydrates that will eliminate dust losses while at the same time improve the overall thermal efficiency of the reactor itself.

We have discovered that we can overcome these disadvantages if we recycle the dust separated in the dust collection system directly to the solids cooling compartment located subjacent to the calcining compartment. When the dust is put into the cooling compartment below the calcining compartment then a dust recirculation is set up between the lower cooling bed and the calcining bed; any temperature increases in these beds is recovered because in the calcining bed it is directly available for calcination of the solids, while in the solids cooling bed the heat is recovered in the form of sensible heat transferred to the incoming fluidizing gases prior to their entry into the upper bed, and this heat is also utilized for partial calcination or dehydration of the dust fraction in the upper beds. The result is a more efficient utilization of the heat added to the calcining bed as a consequence of which the cost per ton of calcined product is greatly reduced.

Briefly, the objects of this invention are attained by the use of a conventional multi-chamber fluidized solids reactor which includes at least one solids calcining bed in which solids are calcined by the combustion of fuel within the bed, and a subjacent solids cooling bed in which the solids are cooled by contact with the uprising fluidizing gases, the dust entrained in the exit gases leaving the calcining bed is separated from the gases and then returned directly to the subjacent solids cooling chamber to commingle therein with solids from the calcining bed while being cooled in the uprising gas stream. This mixture is then discharged from the cooling chamber as product.

We are unable to completely explain the fact that introduction of partially calcined dust to the cooling bed results in a final mixed product (dust plus downwards transferred material) of high commercial grade. The cooling bed is usually maintained at a temperature in the range of 800° F. to 1000° F., whereas it is generally believed that the proper calcination of aluminum hydrate to yield a non-hygroscopic form must be carried out at temperatures at least as high as 1700–1800° F. However, the excellent results appear to be partly due to recirculation of some of the dust upwards into the hot calcining region.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

In the drawing, there is shown a preferred four compartment reactor embodying this invention.

In the figure there is shown a reactor, generally designated R, comprising a cylindrical section 11, having a steel outer wall 12, and lined with refractory materials 13. The reactor has a top 14, and a coned bottom 15, which is equipped with a clean out conduit 16, valved as at 17.

The reactor is divided into 4 zones—A, B, C and D, as indicated in the drawing. Zone A is defined by an apertured constriction plate 18 spaced below the top of the reactor and adapted to contain thereon a bed 19 of solids, above which is a freeboard space 20. Zone B is similarly defined by an apertured constriction plate 22 disposed below constriction plate 18. Constriction plate 22 is adapted to support thereon a bed of solids 23 over which is a freeboard space 24. Zone C is similarly defined by apertured constriction plate 25 which is adapted to support a bed of solids 26 above which is a freeboard space 27. Zone D is defined similarly to the other zones by apertured constriction plate 28 adapted to support bed 29 over which is freeboard space 30.

Solids to be treated are admitted into the reactor via conduit 35 which is valved as at 36. These incoming solids enter bed 19 from whence they overflow through conduit 37 into bed 23. Conduit 37 is equipped with a cone valve assembly 38 which prevents the upward passage of the gas through the conduit in order to promote proper solids flow through the conduit. Solids from bed 23 overflow into bed 26 through conduit 39 which is equipped with a cone valve 40. Solids from bed 26 overflow via conduit 41 into bed 29. Conduit 41 is equipped with a cone valve assembly 42. Each bed of the reactor is equipped with a clean out valve, but these are omitted from the drawings to avoid unnecessary complications. Solids finally discharging from the reactor do so via conduit 45 which is valved as at 46.

Fluidizing gas is admitted to the reactor by way of coned bottom 15 via conduit 51 which is valved as at 50. This gas passes successively upwardly through the four beds of the reactor and eventually exits from the reactor via conduit 60. Since this exiting stream of gas contains entrained dust it is passed directly into dust collection station 61 where the dust and the gas are separated. The dust-free gas is discharged via conduit 62 to further cleaning, heat exchange, or to process. The separated dust discharges via tailpipe 63 into conduit 64 from whence it is discharged into freeboard zone 30 from whence it falls into bed 29. Regulation of the flow of solids through conduit 64 is accomplished by means of valve 65 in conjunction with air ejector 66 and air regulating valve 67. Valve 68 is provided for cleaning out tailpipe 63 or bypassing part of the dust for test purposes or other reasons, if desired.

In starting up the reactor, it is necessary to add heat in order to reach reaction and fuel combustion temperatures. This initial supply of heat is furnished by the use of torch 70 which has leading into it a valved fuel supply line 72 and a valved air supply line 71. After the reactor has attained operating temperatures and bed 26 has reached a sufficiently high temperature so that it will support the combustion of fuel, torch 70 is cut off and heat is thereafter supplied by admitting fuel via conduit 73 and valve 74 in a regulated quantity and combusting that fuel directly within bed 26. Normally several fuel injection ports are provided in the calcining bed. These cannot be seen in the drawings but will be generally located around the circumference of the bed.

The critical features of this invention reside in the dust recycle system which provides for the return of the dust fraction directly to cooling zone D.

It should be pointed out that in no case can the temperature of section 29 be as high as that of bed 26 which is the primary calcining bed. However, the temperature of bed 29 will be higher than that of the dust fraction and this temperature differential apparently subjects the dust fraction to some type of thermal action which converts it to a non-hygroscopic form.

During operation, feed is supplied via conduit 35 and is preheated in bed 19. The uprising gases carry part of the dust fraction from the reactor before any calcination occurs while the remainder of the dust is transferred with the coarse fraction into bed 23. Here (bed 23) further preheating occurs and more dust is entrained in the uprising gases. The preheated solids are then trnsferred to calcining bed 26 for high temperature calcination. In bed 26 even more dust is given up to the gas stream. The result of this constant dust entrainment is that the dust fraction finally recovered in the cyclone is a mixture of uncalcined and partially calcined dust. This mixture is returned to cooling zone D where it mixes with fully calcined material from bed 26 and the resulting mixture is cooled by incoming cold gases. The resulting cooled mixture is the product.

*Example I*

In the experimental calcination of aluminum trihydrate in a four compartment reactor similar with that shown in the accompanying figure, the reactor was operated under such conditions that the temperature in the calcining chamber was substantially 1700° F. The first preheat bed was maintained at about 330° F. while the temperature of the second bed was about 690° F. and the cooling bed was maintained at about 900° F.

Feed to the reactor had a moisture content of 12% by weight. During operation the quantity of dust entrained in the exit gases and ultimately separated in the dust separator amounted to 22% of the total product yielded from the reactor feed.

Analysis of the treated materials showed that the water absorption of the material leaving the calcining compartment was 2.9% and the material showed a loss on ignition of 0.6%. Analysis of the dust fraction recovered from the cyclone showed it to have a water absorption of 5.9% and a loss on ignition of 4.2%. Surprisingly, when the dust fraction was added directly to the cooling zone and there blended with the calcine from the calcining compartment the ultimate product, upon analysis, showed a water absorption of only 2.4% and a loss on ignition of only 0.6%. It is impossible to explain these results on any rational basis because combining those two products should have yielded a mixture having a water absorption at least as high as 2.9% and a loss on ignition considerably higher than 0.6%. Particular attention is directed to the fact that the temperature in the cooling compartment was relatively low being on the order of 900° F. whereas normal calcining temperature to yield a non-hygroscopic calcine is usually in the range of 1650° F.–1850° F.; and in this particular case was actually measured at 1690° to 1700° F.

*Example II*

Using the same feed as that ultilized in the Example above, at operating temperatures of 1800° F. in the calcining chamber, 420° F. in the first preheat bed, 800° F. in the second preheat bed and 940° F. in the cooling bed, conditions were such that the dust fraction recovered from the dust cyclone represented 25.5% of the total product.

Upon analysis, the dust fraction showed a water absorption of 5.7% and a loss on ignition of 4.7%. The calcine from zone C showed a water absorption of 2.1% and a loss on ignition of 0.4%. These two products, after mixing in the cooling compartment showed a water absorption of 2.3% and a loss on ignition of 0.4%. In this particular test it is noteworthy that the temperature of the cooling bed was only 940° F. while the temperature of the calcining bed was maintained substantially constant at 1800° F.

Further economic advantages of our process are readily recognized when calculations are made on the fuel consumption required to produce one ton of satisfactory product. In a case where the dust fraction is not recycled then only 75% of the total product is satisfactory product and the oil consumption per ton of product, including unacceptable product was approximately 21.3 gallons. If, however, it is remembered that, of the total solids, only 75% is satisfactory product, then the actual oil consumption per ton of satisfactory product is $$21.3 \times \frac{100}{75}$$

which gives an approximate fuel consumption of 28 gallons per ton. If, however, the dust is recycled in accordance with this invention, then the fuel consumption of 21.3 gallons per ton means that only 21.3 gallons of fuel are required for each full ton of acceptable product. Thus, it can be seen that the return of dust to the cooling chamber represents an appreciable saving in oil as well as eliminating the problem of separately treating the dust in order to obtain a satisfactory product.

It is significant, that upon microscopic and X-ray examination the final product including the dust fraction which was blended with the coarse fraction in the cooling chamber showed no significant amount of uncalcined material to be present and the product was more uniformly calcined than that yielded by conventional rotary kiln operation.

Although in the foregoing description and examples we have referred to our process as being carried out in a four compartment fluidized solids reactor, it is to be understood that our process is not limited to a four compartment reactor and may be carried out in any reactor having at least two beds including an upper solids calcining bed and a subjacent solids cooling bed both of which are fluidized by the successive upward passage of gas therethrough. The primary requirement of our invention is that the gases exiting from the top of the reactor are cleaned to separate the dust therefrom and this dust is returned to a cooling chamber below the calcining chamber so that the gases uprising from the cooling chamber (to which the dust is returned) will pass upwardly into the superjacent calcining chamber to act as the fluidizing medium therein.

We claim:

1. The continuous process for calcining finely-divided alumina hydrate solids, comprising the steps of establishing and maintaining in an enclosed chamber superposed beds of finely-divided alumina solids including a preheating bed, a calcining bed maintained at temperatures sufficient to convert alumina hydrate to substantially non-hygroscopic anhydrous alumina, and a solids cooling bed subjacent said calcining bed and maintained at temperatures lower than those required to convert alumina hydrate to its non-hygroscopic form in the calcining bed, passing a stream of gas upwardly through all of said beds successively at veolcities sufficient both to fluidize the bed solids as turbulent suspension and to entrain a portion of such solids, supplying finely-divided alumina hydrate to the preheating bed and therethrough to the calcining bed, calcining a portion of such solids in the calcining bed to yield susbtantially non-hygroscopic alumina while entraining another portion of such solids in the uprising gas stream before their full conversion to the non-hygroscopic form is achieved, transferring calcined solids from the calcining bed to the subjacent cooling bed, discharging gas from said chamber above the preheating bed with its entrained solids accumulated by entrainment from the successively lower beds including uncalcined hydroscopic solids entrained from the preheating bed, intercepting the solids-laden gas and separating solids from it, supplying such separated solids directly to the solids cooling bed to commingle therein with the non-hydroscopic calcined solids, thereby effecting in said cooling bed the conversion of hygroscopic solids separated from the gas to a non-hygroscopic form, and discharging non-hygroscopic solids from such cooling bed.

2. Process according to claim 1 in which the calcining bed is maintained at temperatures in the range from substantially 1600° F. to substantially 1800° F. while the cooling bed is maintained at a temperature in a range substantially 800° F. to substantially 1000° F.

References Cited in the file of this patent

UNITED STATES PATENTS

| 2,025,464 | Roberts et al. | Jan. 13, 1935 |
| 2,548,642 | White | Apr. 10, 1951 |
| 2,642,337 | Newsome | June 16, 1953 |

OTHER REFERENCES

Mellor: "Comprehensive Treatise on Inorganic and Physical Chemistry," published by Longmans, Green and Co., New York, 1924, vol. 5, page 266.